Figure 2:
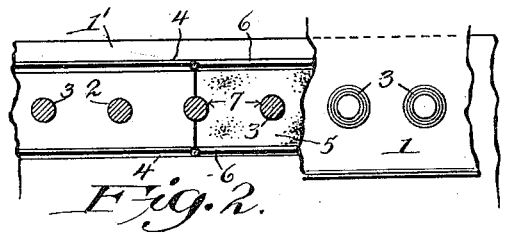

B. J. D. BLACKMORE.
METALLIC JOINT.
APPLICATION FILED NOV. 3, 1913.

1,272,000.

Patented July 9, 1918.

Witnesses:

Inventor:
Bernard J. D. Blackmore
Attorneys.

UNITED STATES PATENT OFFICE.

BERNARD J. D. BLACKMORE, OF OCONOMOWOC, WISCONSIN, ASSIGNOR OF ONE-THIRD TO PERCY S. BRUKAKER, OF CHICAGO, ILLINOIS.

METALLIC JOINT.

1,272,000.                    Specification of Letters Patent.          Patented July 9, 1918.

Application filed November 3, 1913.   Serial No. 798,946.

*To all whom it may concern:*

Be it known that I, BERNARD J. D. BLACKMORE, a citizen of the United States, and resident of Oconomowoc, in the county of Waukesha and State of Wisconsin, have invented certain new and useful Improvements in Metallic Joints; and I do hereby declare that the following is a full, clear, and exact description thereof.

My invention relates to improvements in means for sealing lap joints and has for its object to provide a simple, effective and economical method for carrying out such a seal. The same consists essentially of a fusible bond strip interposed between opposed metallic surfaces and subjected to heat whereby said strip is rendered plastic at a comparatively low temperature to spread and effectively fill the interstices of said opposed metallic surfaces to form a hermetic seal.

Figure 1:
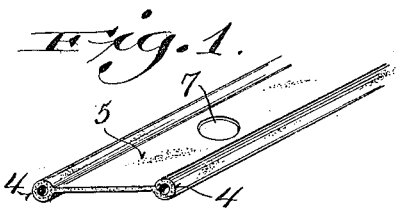

With this general object in view the invention resides in certain peculiarities of construction, combination and arrangement of parts which will be hereinafter more particularly described and claimed and shown in the drawing, in which:

Figure 1 represents a perspective view of a fragment of a fusible bond strip constructed in accordance with my invention, and Fig. 2 is a detail plan view of a joint embodying my bond strip, parts being broken away to more clearly show their relation.

The invention is primarily adapted for use in connection with the riveted seams of containers such as boilers, oil tanks or analogous articles utilized for highly volatile fluids. Therefore in the present drawing the numerals 1 and 1' will be assumed to represent the lapped ends of a pair of metallic boiler plates, each having a longitudinal row of spaced rivet holes 2 through which rivets 3 are disposed and headed.

Before, however, the over-lapped ends 1 and 1' are riveted together, their contact faces are provided with opposed semi-circular grooves 4, one of said grooves being disposed on each side of the row of rivet holes and parallel to the longitudinal plane thereof. Under certain conditions it may be desirable to provide such grooves in only one plate. The seal, however, is applied in the same manner in either case.

Such seal is formed by ribbon-like bond strip 5 of a width approximately equal to the distance between said grooves 4 and of very thin readily fusible material. The outer longitudinal edges of the strip are provided with beads 6 which are disposed in the grooves 4, and at predetermined points the strip has rivet receiving holes 7 which aline with the holes 2 in the plates 1 and 1'. These beads are preferably cored to form tubes and may, if desired, contain flux to aid in forming the joint. After the bond strip has been interposed between the plates 1 and 1' as shown in Fig. 2 and heat applied thereto the opposed faces of said plates will be sealed by the fusible material of which the strip is formed entering the minute interstices of the metal. Owing to the comparatively small cross sectional area of the bond strip the faces of the plates will not be spaced apart an appreciable distance. This construction together with the fact that the strip is of very readily fusible metal, will permit the same to become operative and seal the over-lapped plates when the heated retaining rivets 3 are applied.

I claim:

A joint comprising lapped metallic plates, having a longitudinal row of alined rivet openings, the adjacent faces of said plates also having a pair of longitudinally extending grooves, disposed one on each side of the row of rivet openings, a fusible bond strip disposed between the plates and consisting of a thin, soft metallic ribbon having openings to aline with those in the plates, said ribbon being of a width equal to the distance between said longitudinal grooves, and beads formed on the longitudinal edges of the ribbon and disposed in said grooves in the plates, and securing rivets extending through their openings, said bond strip being so disposed with respect to the rivets in assembled position as to be fused by the heat incidental to applying said rivets.

In testimony that I claim the foregoing I have hereunto set my hand at Milwaukee, in the county of Milwaukee and State of Wisconsin, in the presence of two witnesses.

BERNARD J. D. BLACKMORE.

Witnesses:
GEO. W. YOUNG,
M. E. DOWNEY.